(12) United States Patent
Amako

(10) Patent No.: US 8,529,782 B1
(45) Date of Patent: Sep. 10, 2013

(54) MICROSTRUCTURE MANUFACTURING METHOD

(75) Inventor: Jun Amako, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 1605 days.

(21) Appl. No.: 12/033,430

(22) Filed: Feb. 19, 2008

(30) Foreign Application Priority Data

Feb. 20, 2007 (JP) ................................ 2007-039870

(51) Int. Cl.
*B44C 1/22* (2006.01)

(52) U.S. Cl.
USPC .................. 216/62; 216/65; 216/87; 216/94; 219/121.68; 219/121.78

(58) Field of Classification Search
USPC ..................... 216/62, 65, 87, 94; 219/121.68, 219/121.78
See application file for complete search history.

(56) References Cited

U.S. PATENT DOCUMENTS

| | | | | |
|---|---|---|---|---|
| 4,490,211 | A * | 12/1984 | Chen et al. ....................... | 216/62 |
| 7,435,468 | B2 * | 10/2008 | Kim et al. ...................... | 428/64.4 |
| 2004/0017747 | A1 * | 1/2004 | Ogawa ....................... | 369/47.46 |
| 2004/0047264 | A1 * | 3/2004 | Kitaura et al. ............. | 369/59.11 |
| 2004/0246884 | A1 * | 12/2004 | Komaki et al. ................ | 369/288 |
| 2005/0045587 | A1 * | 3/2005 | Kawaguchi et al. ............ | 216/65 |
| 2005/0196576 | A1 * | 9/2005 | Itoh et al. ...................... | 428/64.4 |
| 2006/0046156 | A1 | 3/2006 | Amako et al. | |
| 2006/0144498 | A1 * | 7/2006 | Iimura et al. .................... | 156/60 |
| 2006/0270108 | A1 * | 11/2006 | Farnworth et al. ............ | 438/106 |

FOREIGN PATENT DOCUMENTS

| | | |
|---|---|---|
| CN | 1740915 A | 3/2006 |
| JP | A-49-48344 | 5/1974 |
| JP | A-62-255985 | 11/1987 |
| JP | A-10-97738 | 4/1998 |
| JP | A-2000-214753 | 8/2000 |
| JP | A 2006-93644 | 4/2006 |
| JP | A-2006-222295 | 8/2006 |
| JP | A-2006-339359 | 12/2006 |

* cited by examiner

*Primary Examiner* — Shamim Ahmed
(74) *Attorney, Agent, or Firm* — Oliff & Berridge, PLC

(57) ABSTRACT

A microstructure manufacturing method includes (a) generating first light including an interference fringe by crossing two laser beams, (b) forming a denatured region and a non-denatured region on an object having thermal non-linearity by applying the first light onto the object, so that the denatured region and the non-denatured region are disposed so as to correspond to a period of the interference fringe of the first light, and (c) etching the object so that the denatured region or the non-denatured region is selectively eliminated.

14 Claims, 12 Drawing Sheets

14

17

MICROSTRUCTURE MANUFACTURING METHOD

The entire disclosure of Japanese Patent Application No. 2007-039870, filed Feb. 20, 2007 is expressly incorporated by reference herein.

BACKGROUND

1. Technical Field

The present invention relates to a technology for manufacturing a microstructure, in particular, a structure (nanostructure) on the order of nanometers, using laser interference exposure. This technology is applicable to processes of manufacturing various nanostructures such as polarization beam splitters, phase retarders, and antireflective surfaces.

2. Related Art

If light enters a structure (subwavelength structure) on the order smaller than a wavelength (order of 380 to 780 nm) of visible light, a phenomenon such as polarization separation, birefringence, antireflection, or plasmon propagation occurs. As one of the methods for manufacturing a subwavelength structure, exposure technologies using laser interference are known (for example, see JP-A-2006-093644). In the exposure technology described in JP-A-2006-093644, a photosensitive film is exposed to interference light (light having interference fringes) obtained by crossing two laser beams. In this case, the period of a pattern formed by the exposure to the interference light depends on a wavelength $\lambda$ of the laser beams and the cross angle between the laser beams. In theory, the shortest possible period that is realized by interference exposure is equal to $\lambda/2$. For example, if the wavelength is 266 nm, the shortest possible period of a formed pattern is 133 nm in theory.

In order to realize a pattern with a period shorter than 133 nm using the above-described interference exposure, the wavelength of the laser beams must be shorter than 133 nm. However, it is difficult to reduce the wavelength of the laser beams under the current circumstances. One of the reasons is that there is no source of highly coherent lasers with a wavelength sufficiently shorter than 266 nm. Among excimer lasers used in the fields of semiconductor lithography and the like are ones with a wavelength of 193 nm, 157 nm, or the like. However, such excimer lasers do not have sufficiently high coherence in the present time. Therefore, it is difficult to form a sharp latent image pattern using these excimer lasers. Another reason is that if the wavelength is shorter than 200 nm, it is difficult to perform exposure in an atmosphere. It is also difficult to obtain materials suitable for optical components (lens, mirror, etc.) included in a laser interference exposure system. This is because, for example, the absorption edge of quartz glass lies around 180 nm. Therefore, a technology is desired that forms a sharp latent image pattern and realizes a fine pattern using this pattern without excessively pursuing a laser beam of a shorter wavelength.

SUMMARY

An advantage of the invention is to provide a technology for realizing a microstructure with high resolution.

According to one aspect (hereafter referred to as a "first aspect" for convenience) of the invention, a microstructure manufacturing method includes (a) generating first light including an interference fringe by crossing two laser beams, (b) forming a denatured region and a non-denatured region on an object having thermal non-linearity by applying the first light onto the object, so that the denatured region and the non-denatured are disposed so as to correspond to a period of the interference fringe of the first light, and (c) etching the object so that the denatured region or the non-denatured region is selectively eliminated.

Here, the "object having thermal non-linearity" refers to a base material (substrate), a coating, a structure, or the like made of a material such as PtO, ZnS—SiO2, Ge—Sb—Te, Ge—Sb—Te—S, Te—TeO2—Ge—Sn, Te—Ge—Sn—Au, Ge—Te—Sn, Sn—Se—Te, Sb—Se—Te, Sb—Se, Ga—Se—Te—Ge, In—Se, In—Se—Tl—Co, Ge—Sb—Te, In—Se—Te, Ag—In—Sb—Te or TeO2—Pb. The "denatured region" refers to, for example, a crystalline region, and the "non-denatured region" refers to, for example, a non-crystalline region.

In the first aspect, by applying the first light having an interference fringe (that is, light intensity distribution) onto the object having thermal non-linearity, a denatured region and a non-denatured region corresponding to a region where the light intensity is relatively high and a region where the light intensity is relatively low, respectively, are obtained. The period of the denatured region and non-denatured region is reduced by shortening the wavelength of the crossed two laser beams or increasing the cross angle. By using the object having thermal non-linearity, a sharper boundary is obtained between the denatured region and non-denatured region than that obtained in a case where a photoresist film or the like is used as is done in related art manufacturing methods, even if the period of the denatured region and non-denatured region is reduced (for example, the order of 100 to 200 nm). Also, since a difference in etching rate is made between the denatured region and non-denatured region, a well-resolved microstructure is formed by etching the object.

According to the first aspect, the microstructure manufacturing method preferably further includes, after step (b) and before step (c), (d) generating second light including an interference fringe by making a phase difference between the two laser beams and then crossing the two laser beams, and (e) forming a denatured region and a non-denatured region by applying the second light onto the object, so that the denatured region and the non-denatured region are disposed so as to correspond to a period of the interference fringe of the second light.

By making a phase difference between the two beams, the interference fringe of the first light and that of the second light are displaced from each other by a fraction of the fringe pitch (for example, ½ pitch, ¼ pitch, etc.). By applying the first light and second light as described above one after another onto the object having thermal non-linearity, the period of the denatured region and non-denatured region is further reduced. Even if the period is further reduced in this way, a sharp boundary is obtained between the denatured region and non-denatured region, since the object having thermal non-linearity is used. As a result, a well-resolved microstructure is obtained.

In the microstructure manufacturing method according to the first aspect, in step (b), third light as well as the first light is preferably applied onto the object. Likewise, in step (d), third light as well as the second light is preferably applied onto the object. While the "third light" is preferably light of a single wavelength, such as a laser beam (laser light), it may be light including components of multiple wavelengths.

By additionally applying third light different from the first light and second light when applying the first light or second light, the light intensity distribution is biased. Thus, the denatured region and non-denatured region are securely formed even if the intensity of the first light or second light is not enough high.

According to another aspect (hereafter referred to as a "second aspect" for convenience) of the invention, a microstructure manufacturing method includes (a) forming a coating having thermal non-linearity on an object, (b) generating first light including an interference fringe by crossing two laser beams, (c) forming a denatured region and a non-denatured region on the coating by applying the first light onto the coating, so that the denatured region and the non-denatured region are disposed so as to correspond to a period of the interference fringe of the first light, (d) etching the coating so that the denatured region or non-denatured region is selectively eliminated, and (e) etching the object using the coating from which the denatured region or non-denatured region has been eliminated.

Here, the "coating having thermal non-linearity" refers to a coating (thin film or thick film) made of a material such as PtO, ZnS—SiO2, Ge—Sb—Te, Ge—Sb—Te—S, Te—TeO2—Ge—Sn, Te—Ge—Sn—Au, Ge—Te—Sn, Sn—Se—Te, Sb—Se—Te, Sb—Se, Ga—Se—Te—Ge, In—Se, In—Se—Tl—Co, Ge—Sb—Te, In—Se—Te, Ag—In—Sb—Te or TeO2—Pb. The "denatured region" refers to, for example, a crystalline region, and the "non-denatured region" refers to, for example, a non-crystalline region.

In the second aspect, by applying the first light having the interference fringe onto the coating having thermal non-linearity, a denatured region and a non-denatured region corresponding to a region where the light intensity is relatively high and a region where the light intensity is relatively low, respectively, are obtained. The period of the denatured region and non-denatured region is reduced by shortening the wavelength of the crossed two laser beams or increasing the cross angle. By using the coating having thermal non-linearity, a sharper boundary is obtained between the denatured region and non-denatured region than that obtained in a case where a photoresist film or the like is used as is done in related art manufacturing methods, even if the period of the denatured region and non-denatured region is reduced (for example, the order of 100 to 200 nm). Also, since a difference in etching rate is made between the denatured region and non-denatured region, the denatured regions or non-denatured region is eliminated by etching the coating. Thus, the eliminated region is made into an opening. By etching the object using the coating having the aperture obtained in this way as an etching mask, a well-resolved microstructure is formed The second aspect preferably further includes, after step (c) and before step (d), (f) generating second light including an interference fringe by making a phase difference between the two laser beams and then crossing the two laser beams, and (g) forming a denatured region and a non-denatured region on the coating by applying the second light onto the coating, so that the denatured region and non-denatured region are disposed so as to correspond to a period of the interference fringe of the second light.

By making a phase difference between the two beams, the interference fringe of the first light and that of the second light are displaced from each other by a fraction of the fringe pitch (for example, ½ pitch, ¼ pitch, etc.). By applying the first light and second light as described above one after another onto the coating having thermal non-linearity, the period of the denatured region and non-denatured region is further reduced. Even if the period is further reduced in this way, a sharp boundary is obtained between the denatured region and non-denatured region, since the object having thermal non-linearity is used. As a result, a better-resolved microstructure is obtained.

In the second aspect, in step (c), third light as well as the first light is preferably applied onto the coating. Likewise, in step (g), third light as well as the second light is preferably applied onto the coating. While the "third light" is preferably light with a single wavelength, such as a laser beam (laser light), it may be light including components of multiple wavelengths.

By additionally applying third light different from the first light and second light when applying the first light or second light, the light application intensity is biased. Thus, the denatured region and non-denatured region are securely formed even if the intensity of the first light or second light is not enough high.

According to yet another aspect (hereafter referred to as a "third aspect" for convenience) of the invention, a method for applying light to a processing target includes (a) generating first light including an interference fringe by crossing two laser beams, and (b) forming a denatured region and a non-denatured region on the processing target having thermal non-linearity by applying the first light onto the processing target, so that the denatured region and the non-denatured region are disposed so as to correspond to a period of the interference fringe of the first light.

Here, specific examples of the "processing target having thermal non-linearity" are the same as those of the "object having thermal non-linearity" in the microstructure manufacturing method according to the first aspect of the invention. Also, respective specific examples of the "denatured region" and "non-denatured region" are the same as those in the first aspect of the invention.

In the third aspect, by applying the first light having interference fringes onto the processing target having thermal non-linearity, a denatured region and a non-denatured region corresponding to a region where the light intensity is a relatively high and region where the light intensity is relatively low, respectively, are obtained. The period of the denatured region and non-denatured region is reduced by shortening the wavelength of the crossed two laser beams or increasing the cross angle. By using the processing target having thermal non-linearity, a sharper boundary is obtained between the denatured region and non-denatured region than that obtained in a case where a photoresist film or the like is used as is done in related art manufacturing methods, even if the period of the denatured region and non-denatured region is reduced (for example, the order of 100 to 200 nm). Therefore, according to this light application method, a microstructure including a denatured region and a non-denatured region periodically disposed at a sub-micron pitch is formed. Also, since the difference in etching rate is made between the denatured region and non-denatured region, a microstructure with high resolution is formed by etching the processing target.

The light application method according to the third aspect preferably further includes, after step (b), (c) generating second light including an interference fringe by making a phase difference between the two laser beams and then crossing the two laser beams, and (d) forming a denatured region and a non-denatured region on the processing target by applying the second light onto the processing target, so that the denatured region and non-denatured region are disposed so as to correspond to a period of the interference fringe of the second light.

By making a phase difference between the two beams, the interference fringe of the first light and that of the second light are displaced from each other by a fraction of the fringe pitch (for example, ½ pitch, ¼ pitch, etc.). By applying the first light and second light as described above one after another onto the processing target having thermal non-linearity, the period of the denatured region and non-denatured region is further reduced. Even if the period is further reduced in this way, a sharp boundary is obtained between the denatured region and non-denatured region, since the processing target having thermal non-linearity is used. Also, a microstructure with a shorter period is obtained by etching this processing target.

In the third aspect, in step (b), third light as well as the first light is preferably applied onto the processing target. Likewise, in step (d), third light as well as the second light is preferably applied onto the processing target. While the "third light" is preferably light of a single wavelength, such as a laser beam (laser light), it may be light including components of multiple wavelengths.

By additionally applying third light different from the first light and second light when applying the first light or second light, the light application intensity is biased. Thus, the denatured region and non-denatured region are securely formed even if the intensity of the first light or second light is low.

According to still another aspect (hereafter referred to as a "fourth aspect" for convenience) of the invention, a microstructure manufacturing method includes (a) forming an amorphous, inorganic material layer on a metal film, (b) applying light generated by crossing a first laser beam and a second laser beam, onto the inorganic material layer, and heating a first portion of the inorganic material layer, the first portion corresponding to a period of an interference fringe of the light, up to a crystallization temperature or higher so that the first portion is denatured into a crystalline portion, (c) eliminating the first portion on the metal film and leaving a second portion of the inorganic material layer, the second portion having not been denatured into the crystalline portion, and (d) eliminating a region of the metal film, the region not overlapping the second portion, so that a structure with a pitch equal to the period of the interference fringe is formed.

In step (c), the second portion may be eliminated while leaving the first portion and, in step (d), a region of the metal film that does not overlap the first portion may be eliminated. This is because which of these portions is eliminated depends on, for example, the material of the inorganic material layer.

In the fourth aspect, the light having the interference fringe (that is, light intensity distribution) is generated by crossing the first and second laser beams. By applying this light including the interference fringe onto the amorphous, inorganic material layer, the first portion corresponding to a region where the light intensity is relatively high and a region where the light intensity is relatively low is denatured into a crystalline portion. The period of the first portion that has been denatured into a crystalline portion and the second portion that has not been denatured into a crystalline portion is reduced by shortening the wavelength of the crossed two laser beams or increasing the cross angle. By using the processing target having thermal non-linearity, a sharper boundary is obtained between the first portion (crystalline portion) and the second portion (non-crystalline portion) than that obtained in a case where a photoresist film or the like is used as is done in related art manufacturing methods, even if the period of the first and second portions is reduced (for example, the order of 100 to 200 nm). Also, since the difference in etching rate is made between the denatured region and non-denatured region, a microstructure with high resolution is formed by etching the object.

In step (b), the first portion is preferably completely heated up to a crystallization temperature or higher in a film thickness direction.

Thus, the first portion is completely crystallized in the film thickness direction.

The metal film preferably includes aluminum, and the structure is preferably a striped grid.

Thus, a microstructure that is usable as an optical element such as a polarization beam splitter is obtained.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will now be described in detail with reference to the accompanying drawings.

Figure 1:
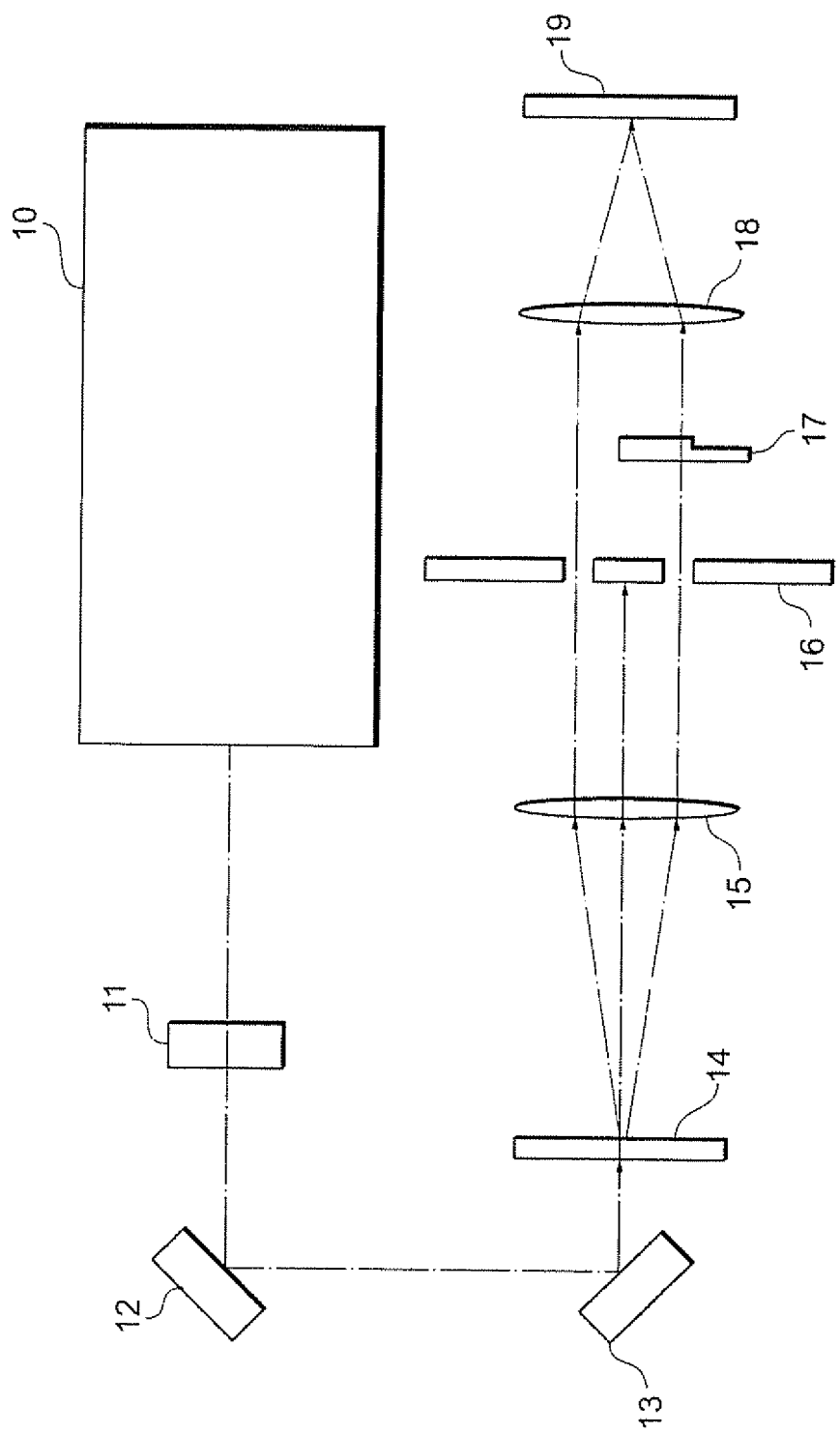
FIG. 1 is a block diagram showing a configuration of an exposure apparatus (microstructure manufacturing apparatus).

FIG. 1 is a block diagram showing a configuration of an exposure apparatus (microstructure manufacturing apparatus) for use in the embodiments of the invention. An exposure apparatus 1 for use in the embodiments, shown in FIG. 1, includes a light source (pulse laser) 10, a shutter 11, mirrors 12 and 13, a diffractive optical element 14, a first lens 15, a spatial filter 16, a phase difference plate 17, and a second lens 18.

The light source 10 outputs laser beams of a short wavelength. For example, a Q switch pulse YAG laser (wavelength: 266 nm) is suitably used as the light source 10. The laser average output of the light source 10 is, for example, approximately 1 W (at the pulse repetition rate of 1 kHz) and the pulse width is, for example, $1\times10^{-9}$ sec. or more and $1\times10^{-7}$ sec. or less. While pulse laser beams are used in the embodiments, the invention is not limited thereto and continuous wave (CW) laser beams may be used. A laser beam emitted from the light source 10 passes through the shutter 11 and then its path (optical path) is folded by each of the mirrors 12 and 13 by 90°. Subsequently, the laser beam enters the diffractive optical element 14. The passage/interruption of the laser beam is controlled by the shutter 11.

Figure 2:
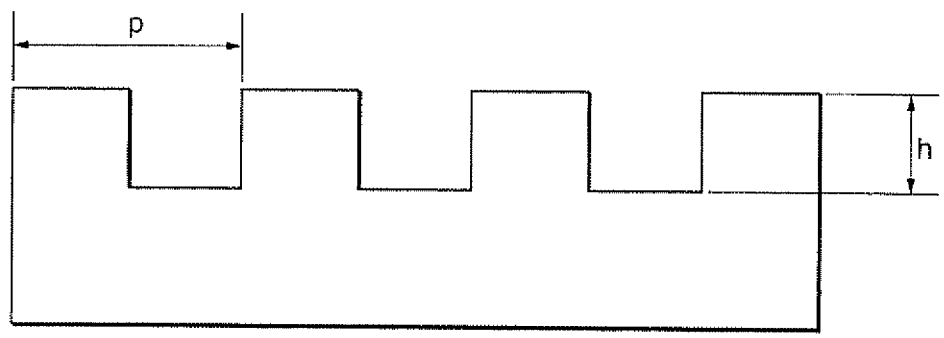
FIG. 2 is a side view of a diffractive optical element.

The diffractive optical element 14 splits the incident laser beam into multiple laser beams (diffraction beams). FIG. 2 is a side view of the diffractive optical element 14. As shown in FIG. 2, the diffractive optical element 14 has a binary structure that has two levels of a gap h (e.g., 266 nm) in a period P (e.g., 0.50 µm) and a surface thereof has a periodic structure. The diffractive optical element 14 is manufactured on a quartz substrate by direct laser-writing and ion-etching. Note that the structure of the diffractive optical element 14 is not limited to a binary structure and a surface thereof may have a sine (cosine)-curved, periodic structure. Or, the diffractive optical element 14 may have a flat appearance and a periodic structure in which the index of refraction is periodically distributed inside the diffractive optical element 14.

The first lens 15 collects the split multiple diffraction beams so as to collimate the beams. In the embodiments, a focal length f1 of the first lens 15 is, for example, 50 mm. The spatial filter 16 passes only two of the multiple diffraction beams therethrough.

Figure 3:
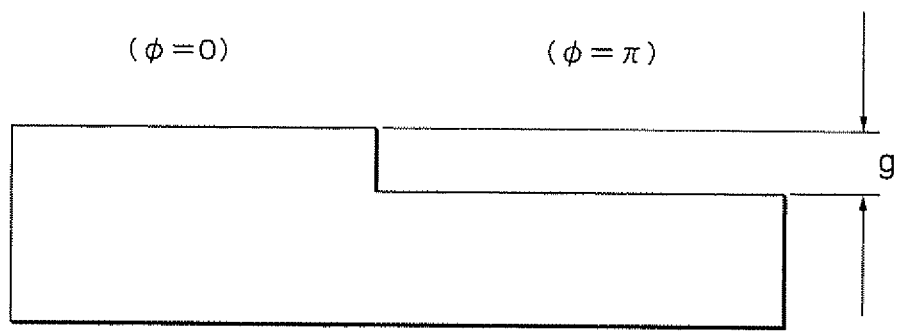
FIG. 3 is a side view of a phase difference plate.

The phase difference plate 17 gives a phase difference between the two beams that have passed through the spatial filter 16. FIG. 3 is a side view of the phase difference plate 17. As shown in FIG. 3, the phase difference plate 17 has a gap with a depth g on a surface thereof. In other words, the phase difference plate 17 has different thicknesses in its right and left regions in the drawing. Thus, a predetermined phase difference (optical path difference) is made between the diffraction beam that has passed through the phase difference plate 17 and the diffraction beam that has not passed therethrough. In the embodiments, a phase difference $\phi$ between the diffraction beam that has passed through a region of the phase difference plate 17 that has a relatively large thickness and the diffraction beam that has not passed through the phase difference plate 17 is set to an integer multiple of $2\pi$, namely, 0. Also, the phase difference $\phi$ between the diffraction beam that has passed through a region of the phase difference plate 17 that has a relatively small thickness and the diffraction beam that has not passed through the phase difference plate 17 is set to $\pi$. The phase difference plate 17 is manufactured on the quartz substrate by laser drawing and ion-etching. Note that the shape of the phase difference plate 17 is not limited to a stepped shape having different thicknesses. For example, the phase difference plate 17 may have a flat appearance and have different diffraction indexes in its right and left regions. If the phase difference is set to $\pi$, a ½ wavelength plate may be used as the phase difference plate 17.

The second lens 18 collects the two diffraction beams that have passed through the phase difference plate 17. A focal length f2 of the second lens 18 is, for example, 28 mm. The two diffraction beams collected by the second lens 18 are applied to an object 19. The two diffraction beams interfere with each other at a predetermined cross angle $\theta$ so as to generate periodic interference fringes (interference light intensity distribution). Thus, a periodic fine pattern corresponding to the interference light intensity distribution is formed on a surface of the object. The time of exposure to the diffraction beams is, for example, on the order of several milliseconds and is controlled by the shutter 11.

In the above-described exposure apparatus 1 for use in the embodiments, the two split diffraction beams are close to each other and the time required to perform interference exposure is as short as the order of several milliseconds. For these reasons, the diffraction beams are very stable against disturbances and resistant to vibrations and air flows. Generally, a laser interference exposure system is sensitive to air flows. In order to keep such a system stable, it must be placed on a vibration isolation bench. Further, a measure such as covering the system and the bench with a robust must be taken. Thus, a large facility cost is required. In the embodiments, a stable exposure system is realized by a simplified apparatus configuration.

Figure 4:
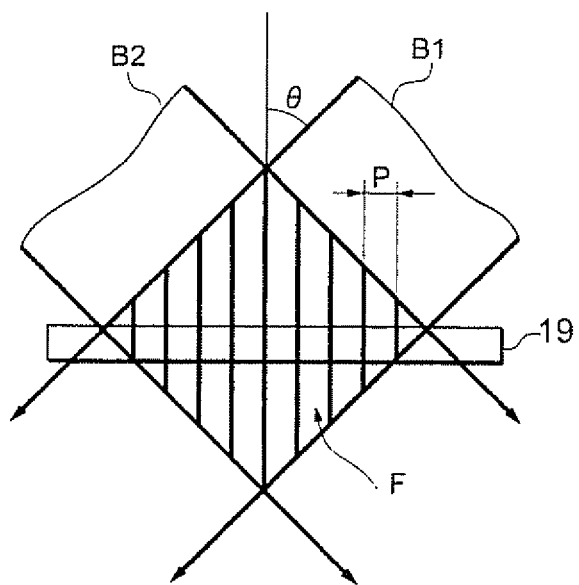
FIG. 4 is a drawing schematically showing an aspect in which interference light generated by crossing two diffraction beams is applied onto an object.

FIG. 4 is a drawing schematically showing an aspect in which interference light generated by crossing the two diffraction beams is applied onto the object. The period P of the interference fringes F obtained when crossing the two diffraction beams at the cross angle $\theta$ is given by the following equation.

$$P=\lambda/(2 \sin \theta) \qquad \text{Equation 1 or Eq. 1}$$

As shown in FIG. 4, the two diffraction beams B1 (first laser beam) and B2 (second laser beam) enter the object 19 in a manner that these beams are symmetrical with respect to the normal to the application surface of the object 19. Thus, the application depth of the interference field and the width thereof, the pitch P of the interference fringes F, and the like are made more uniform.

Figure 5:
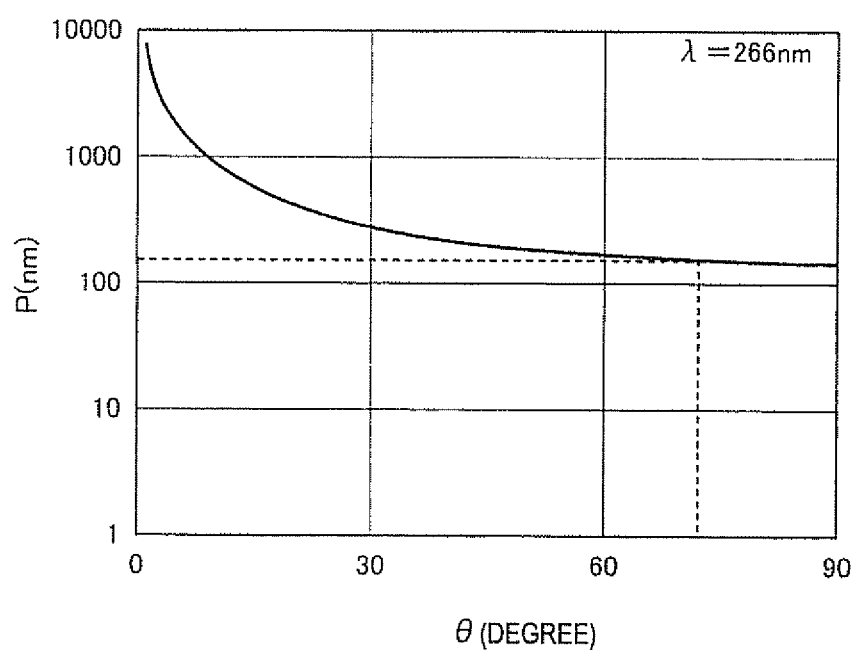
FIG. 5 is a graph showing the relation represented by Eq. 1.

FIG. 5 is a graph showing the relation represented by Eq. 1 above. The horizontal axis corresponds to the cross angle $\theta$, and the vertical axis corresponds to the period P of the interference fringes F. As shown in FIG. 5, for example, if the wavelength is 266 nm and the cross angle $\theta$ is 72°, the period P of the interference fringes F is 140 nm. By applying the interference light including the interference fringes with such a narrow pitch to the object 19, a desired treatment can be performed on the object 19. In the embodiments, a material having thermal nonlinearity is used as the object 19. The material having thermal nonlinearity will be described below.

Figure 6:
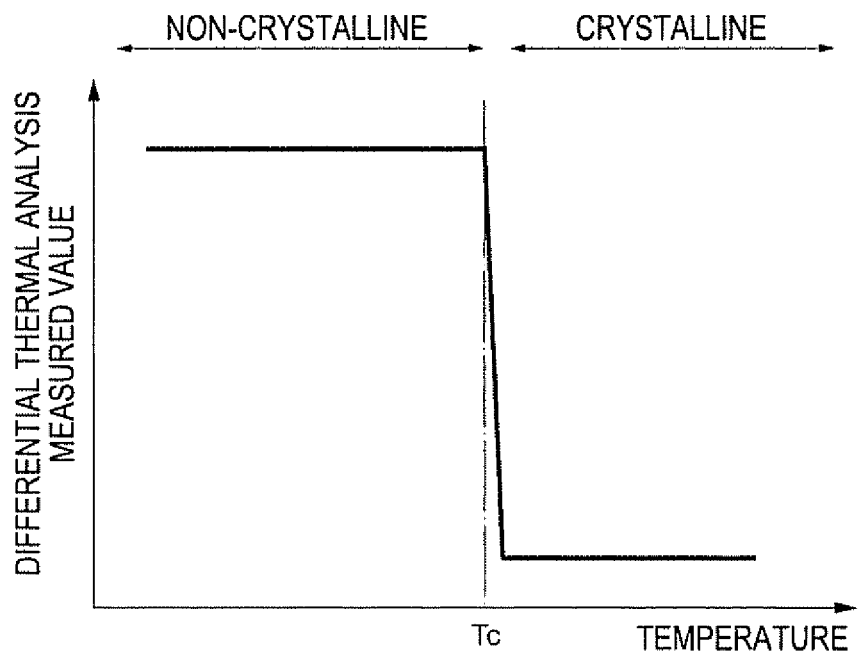
FIG. 6 is a diagram showing one example of a material having thermal nonlinearity.

FIG. 6 is a diagram showing one example of the material having thermal nonlinearity. Specifically, FIG. 6 shows the measurement result of a differential thermal analysis of the material (e.g., platinum oxide (PtO)) having thermal nonlinearity. As illustrated, for example, if platinum oxide is heated, a phase change occurs around a temperature of 550 C.° and the platinum oxide is changed from a non-crystalline state (non-denatured state) into a crystalline state (denatured state). The temperature at which such a phase change occurs is referred to as a transition point Tc. Also, in the embodiments, a material in which a phase change abruptly (that is, non-linearly) occurs due to a rise in temperature as described above is referred to as a "material having thermal non-linearity. If the object 19 having both non-crystalline regions and crystalline regions based on the presence/absence of a phase change as described above is immersed into an alkali solution, for example, the crystalline regions are etched faster, since there is a difference in etching rate between these two types of regions. Thus, convex portions and concave portions, which correspond to the non-crystalline regions and crystalline regions, respectively, are generated. In the embodiments, the material having such thermal non-linearity is exposed to the above-described interference light.

Figure 7:
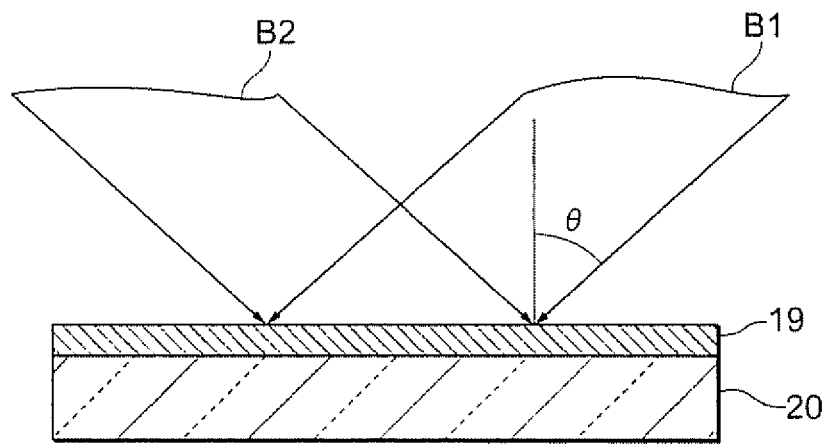
FIG. 7 is a drawing schematically showing exposure of the material having thermal non-linearity.
Figure 8:
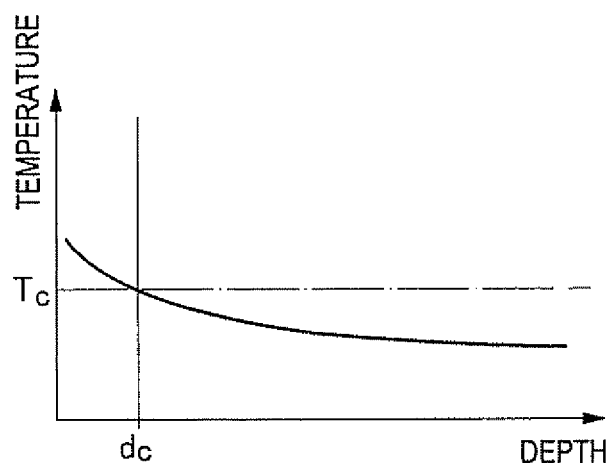
FIG. 8 is a graph showing the depth of a phase change caused according to a change in temperature.
Figure 9:
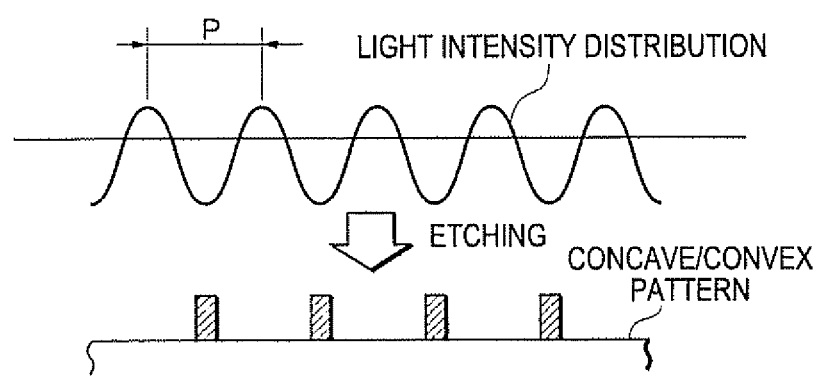
FIG. 9 is a diagram schematically showing an aspect of a surface-relief pattern formed according to the period of interference fringes.

FIG. 7 is a drawing schematically showing exposure of the material having thermal non-linearity. As shown in FIG. 7, the interference light generated by crossing the two diffraction beams is applied onto the object 19 formed on the substrate 20 (e.g., glass substrate). Thus, periodic phase changes corresponding to the pitch P of the interference fringes F of the interference light occur on a surface of the object 19 made of a material having thermal non-linearity. Specifically, regions of the object 19 in which the intensity of the interference light is relatively high are heated so that the transition point Tc is exceeded by the temperatures in these regions. This causes phase transitions in these regions, thereby putting these regions into a crystalline state. On the other hand, regions of the object 19 in which the intensity of the interference light is relatively low are not heated very much so that the transition point Tc is not exceeded by the temperatures in these regions. Thus, these regions cause no phase transitions and remain in a non-crystalline state. As shown in FIG. 8, the depth of a caused phase change is a depth dc from the surface of the object 19. The temperature of the object 19 exceeds the transition point Tc up to the depth dc. Taking this into account, the thickness of the object 19 is previously set to the dc or less so that the object 19 is completely heated up to the transition point Tc or higher in the film thickness direction. After undergoing application of the interference light, the object 19 is immersed into an alkali solution. Thus, a surface-relief pattern (with the depth dc) having a period equal to the period P of the interference fringes is formed on the surface of the object 19. This aspect is schematically shown in FIG. 9. FIG. 9 shows a case where regions in which the light intensity is relatively low and that remain in a non-crystalline state are left. Note that there is also a case where regions in which the light intensity is relatively high are left. In that case, the convex portions in the surface-relief pattern are arranged so as to correspond to the high positions in the light intensity distribution. Since the phase change curve has high non-linearity as shown in FIG. 6, a sharp surface-relief pattern with a small width is realized by properly controlling the conditions of application of the laser beams.

In addition to the above-described platinum oxide, the following inorganic materials may be used as the material having thermal non-linearity. In the embodiments, a material that has once been crystallized need not be decrystallized again; therefore, materials that cause an irreversible phase change may also be used. Among such irreversible change materials are ZnS—SiO$_2$, Ge—Sb—Te, Ge—Sb—Te—S, Te—TeO$_2$—Ge—Sn, Te—Ge—Sn—Au, Ge—Te—Sn, Sn—Se—Te, Sb—Se—Te, Sb—Se, Ga—Se—Te—Ge, In—Se, In—Se—Tl—Co, Ge—Sb—Te, In—Se—Te, Ag—In—Sb—Te, and TeO$_2$—Pb. Any of these materials may be used as the object 19.

The configuration of the exposure apparatus 1 for use in the embodiments and its exposure principles (that is, light application method) have been described above. A microstructure manufacturing process (manufacturing method) according to a first one of the embodiments will now be described.

Figure 10A:
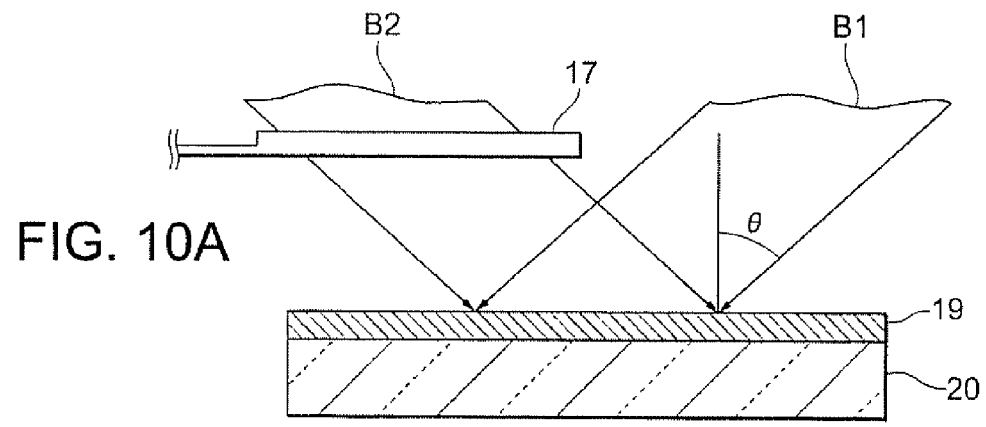
FIGS. 10A to 10C are schematic sectional views showing a microstructure manufacturing process according to a first embodiment of the invention.
Figure 10B:
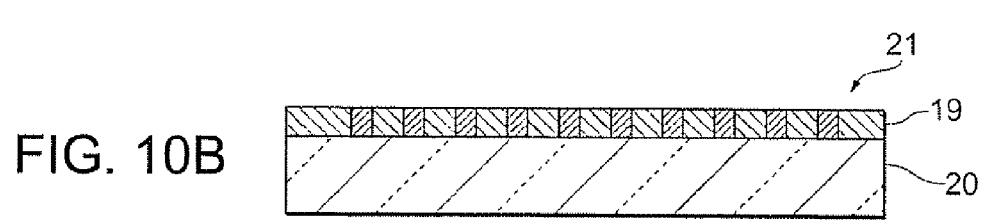
Figure 10C:
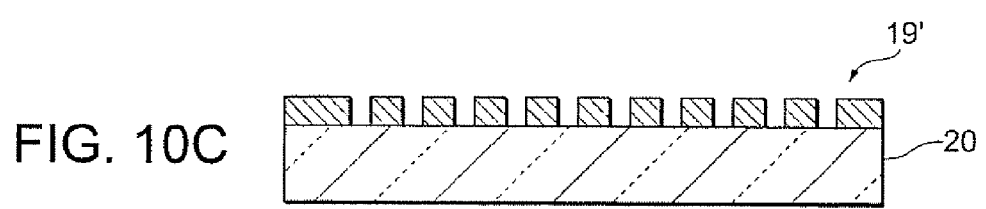

FIGS. 10A to 10C are schematic sectional views showing the microstructure manufacturing process according to this embodiment. Interference light (first light) is generated by crossing two diffraction beams at a predetermined cross angle θ using the above-described exposure apparatus 1. Then, the interference light is applied onto the object 19 on the substrate 20 (FIG. 10A). In this case, the phase difference φ between the diffraction beam B2 that is one of the two diffraction beams and passes through the phase difference plate 17 and the diffraction beam B1 that is the other diffraction beam and does not pass therethrough is set to 0. Note that in order to illustrate the phase difference plate 17 in FIG. 10, the phase difference plate 17 is drawn obliquely relative to the diffraction beam B2 for convenience. However, as shown in FIG. 1, the phase difference plate 17 is actually disposed so that the diffraction beam B2 is orthogonal to a surface of the phase difference plate 17. The same goes for the drawings to be described below.

The two diffraction beams B1 and B2, which are crossed at the cross angle θ, interfere with each other so that periodic interference fringes (interference light intensity distribution) are generated (see FIG. 4). Application of such interference light having the interference light intensity distribution to the object 19 causes phase transitions in regions of the object 19 in which the light intensity is high. Thus, these regions (first portions) 21 are put into a crystalline state (FIG. 10B). The period of the regions 21 that have been put into a crystalline state (hereafter referred to as "crystalline regions 21") is equal to the period of the interference light intensity distribution. The application time (exposure time) of the interference light is, for example, on the order of several milliseconds and is controlled by the shutter 11.

Next, etching is performed by immersing the object 19 into an alkali solution. At that time, a difference in etching rate is made between the crystalline regions 21 and other regions (that is, non-crystalline regions). Thus, for example, the crystalline regions 21 are eliminated faster than the non-crystalline regions (second portions). As a result a pattern (for example, platinum oxide pattern) of the non-crystalline regions 19' with a period (in this example, 140 nm) corresponding to the period of the interference fringes of the interference light (FIG. 10C). A microstructure of such a subwavelength order has various applications. It should be noted that the difference in etching rate made between the crystalline regions 21 and non-crystalline regions 19' depends on the material of the object 19 or the relation between the etching solution and the material. For this reason, the non-crystalline regions 19' are eliminated faster than the crystalline regions 21 in some cases. In those cases, a pattern of the crystalline regions 21 is obtained.

As described above, according to this embodiment, by applying the interference light (first light) having interference fringes to the object having thermal non-linearity, denatured regions (crystalline regions) and non-denatured regions (non-crystalline regions) corresponding to regions in which the light intensity is relatively high and regions in which the light intensity is relatively low, respectively, are obtained. The period of these denatured regions and non-denatured regions is reduced by shortening the wavelength of the two crossed laser beams or increasing the cross angle θ. By using the object having thermal non-linearity, sharper boundaries are obtained between the denatured regions and non-denatured regions than those obtained in a case where a photoresist film or the like made of an organic material is used as is done in related art manufacturing methods, even if the period of the denatured regions and non-denatured regions is as short as the order of 100 to 200 nm. Also, since a difference in etching rate is made between the denatured regions and non-denatured regions, a well-resolved microstructure is formed by etching the object.

FIGS. 11A to 11D are schematic sectional views showing a microstructure manufacturing process according to a second one of the embodiments. While it is assumed in the first embodiment shown in FIG. 10 that the pattern (for example, a platinum oxide pattern) itself of the non-crystalline regions 19' obtained by etching is used as a microstructure, the fine pattern of the non-crystalline regions 19' (or crystalline regions 21) may be transferred to another object by using the pattern as an etching mask. Such a case will now be described. The same steps as those in the above-described manufacturing process will be described in a simplified manner as appropriate.

Figure 11A:
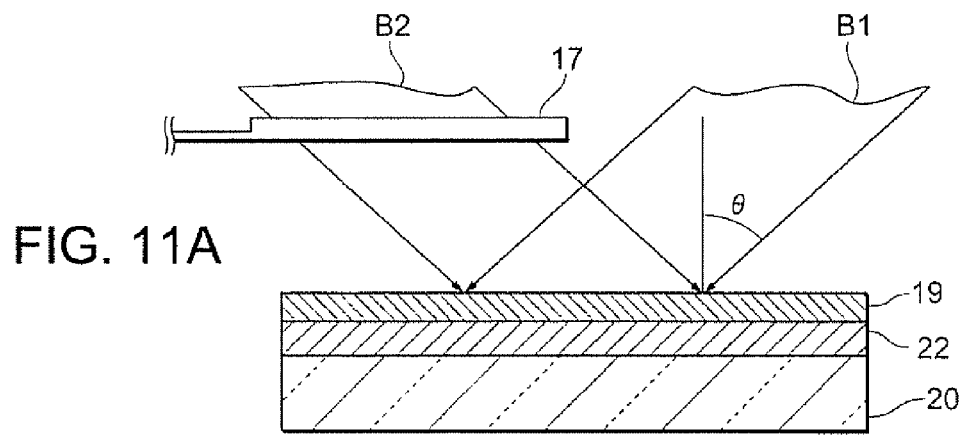
FIG. 11A to 11D are schematic sectional views showing a microstructure manufacturing process according to a second embodiment of the invention.

In this embodiment, an object 22 is previously formed on the substrate 20, as shown FIG. 11A. Also, a coating 19 (for example, a platinum oxide film) is previously formed on a surface of the object 22. While the material of the object 22 is not limited to a particular one, it is assumed in this embodiment that the object 22 is a metal film made of aluminum or silver. Also, the substrate 20 itself may be an object. As with the first embodiment, interference light (first light) is generated by crossing two diffraction beams at the cross angle θ. Then, the interference light is applied onto the coating 19. Thus, as with the first embodiment, the crystalline regions 21 are formed on the coating 19 (FIG. 11B).

Figure 11B:
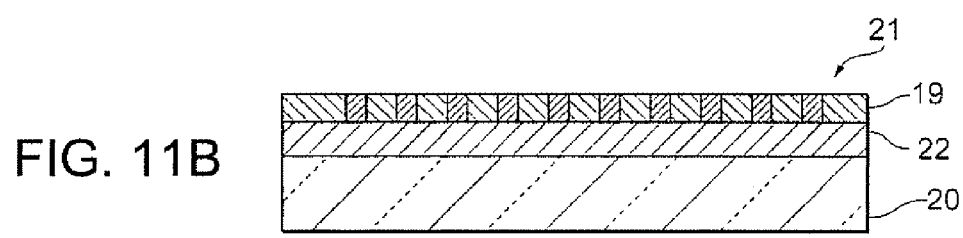
Figure 11C:
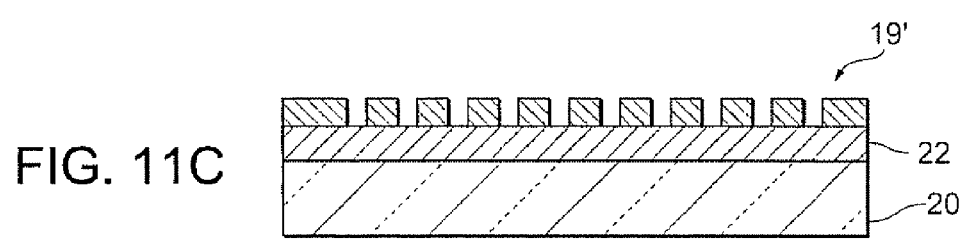
Figure 11D:
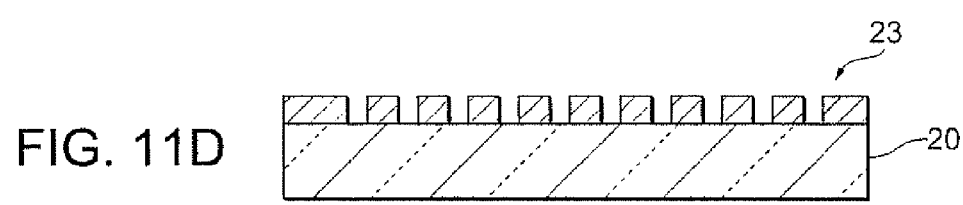

Next, by performing etching as in the first embodiment, the pattern (for example, a platinum oxide pattern) of the crystalline regions 21 with a period corresponding to the period of the interference fringes is eliminated, and the pattern of the non-crystalline regions 19' of the coating 19 is left (FIG. 11(C)). Subsequently, the object 22 is etched using the pattern of the non-crystalline regions 19' as an etching mask. A specific technique for the etching is preferably selected as appropriate depending on the object 22. For example, dry etching is performed in this embodiment. Thus, the pattern of the non-crystalline regions 19' is transferred to the aluminum film serving as the object 22 (FIG. 11D). That is, portions of the aluminum film that do not overlap the non-crystalline regions 19' (second portions) are eliminated. Thus, a striped aluminum film 23 (aluminum grid) with a period of 140 nm is formed on the substrate 20.

If the same steps as those shown in FIGS. 11A to 11C are performed without previously forming the object 22, the pattern of the non-crystalline regions 19' (or crystalline regions 21) is transferred to a surface of the substrate 22 (not shown).

Figure 12A:
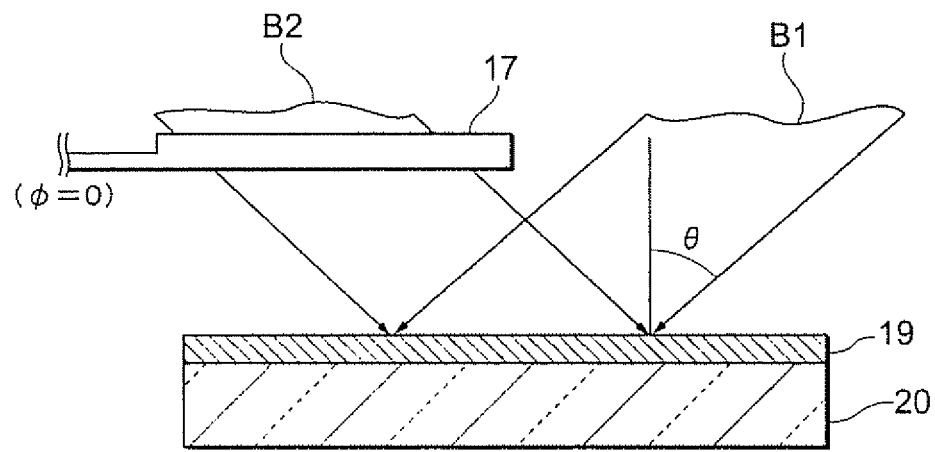
FIGS. 12A and 12B are schematic sectional views showing a microstructure manufacturing process according to a third embodiment of the invention.
Figure 12B:
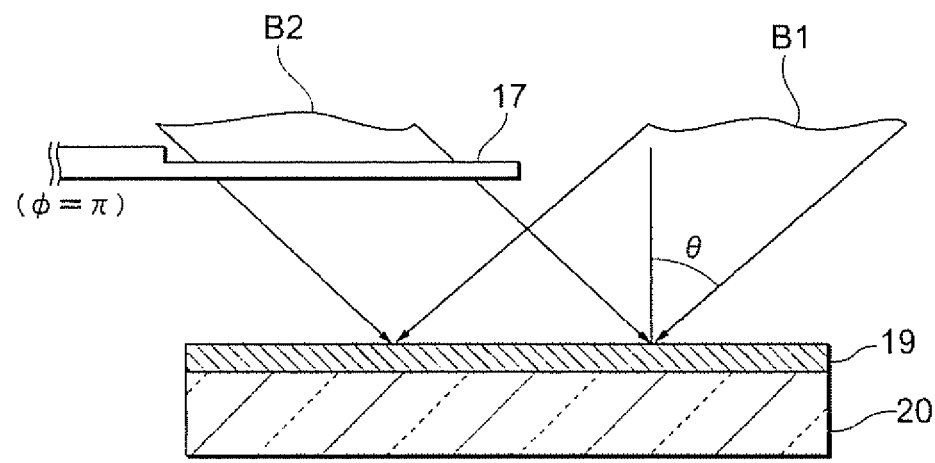

As described above, by using the coating having thermal non-linearity, sharper boundaries are obtained between the denatured regions and non-denatured regions than those obtained in a case where a photoresist film or the like is used as is done in related art manufacturing methods, even if the period of the crystalline regions (denatured regions) and non-crystalline regions (non-denatured regions) is reduced (for example, the order of 100 to 200 nm). Also, since a difference in etching rate is made between the crystalline regions and non-crystalline regions, the crystalline regions (or non-crystalline regions) are eliminated by etching the coating so that apertures are made in the crystalline regions. By etching the object using the coating having the apertures obtained in this way as an etching mask, a well-resolved microstructure is formed FIGS. 12A and 12B are schematic sectional views showing a microstructure manufacturing process according to a third one of the embodiments. It is also preferable to perform the interference light application step twice or more in the first and second embodiments described with reference to FIGS. 10A to 10C and FIGS. 11A to 11D and further as shown in FIG. 12 and to make a phase difference between the two diffraction beams B1 and B2 in each such step.

Figure 13:
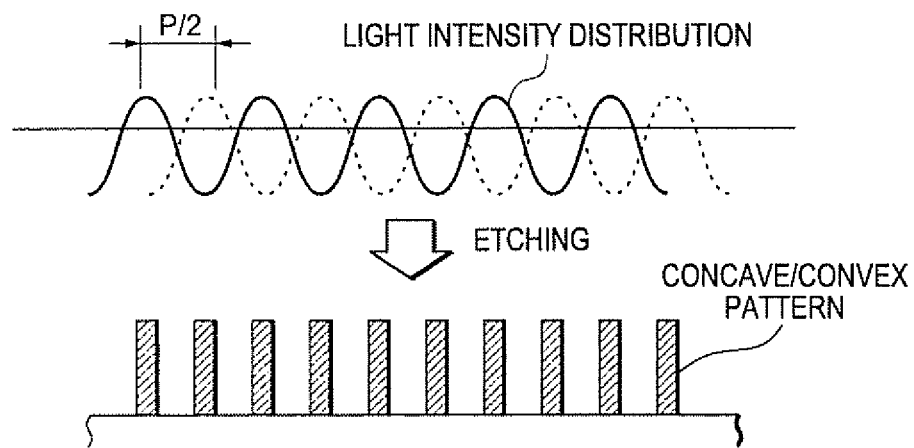
FIG. 13 is a diagram schematically showing an aspect of a surface-relief pattern formed according to the period of interference fringes.

Specifically, in a step shown in FIG. 12A, as with the first and second embodiments, the phase difference ϕ between the two diffraction beams B1 and B2 is set to ϕ (arbitrary value) and the two diffraction beams are crossed. Interference light (first light) generated in this way is applied onto the object 19. Assume that the state of ϕ=0 is a reference state (state in which the phase difference is 0). Next, in a step shown in FIG. 12B, the phase difference ϕ between the two diffraction beams B1 and B2 is set to ϕ+π and the two diffraction beams are crossed. Interference light (second light) generated in this way is applied onto the object 19. The setup of the phase difference is realized by changing the disposition of the phase difference 17 as described above. By performing such multiple exposures, crystalline regions that repeat at the period P so as to correspond to a light intensity distribution (indicated by a solid line in the drawing) obtained by the first exposure are obtained as shown in FIG. 13. Also, crystalline regions that repeat at the period P so as to correspond to a light intensity distribution (indicated by a dotted line in the drawing) obtained by the second exposure are obtained in the positions displaced from the crystalline regions obtained by the first exposure by P/2. Thus, as a whole, a pattern of crystalline regions that repeat at the period P/2 is obtained. By etching the object 19 in such a state, a surface-relief pattern with the P/2 period is obtained. Since a reaction of the object 19 to light is non-linear as described above (see FIG. 6), the pattern of the crystalline regions is prevented from losing its sharpness even after performing the second exposure. Thus, a pattern with a short pitch is obtained.

In comparison with this embodiment, think about an object whose reaction to light is linear (for example, an ordinary photoresist film, etc.). If the object is multiple times exposed to interference light with a pitch similar to that described above, no periodic pattern will be formed in the object. This is because the process in which a photoresist or the like reacts to light is one-photon absorption. Incidentally, in this embodiment, a case in which the amount of phase shift between the diffraction beams is set to π and a periodic pattern with a ½ wavelength is formed has been described. However, if the amount of phase shift is set to π/2, a periodic pattern with a ¼ wavelength is formed. Further, if the amount of phase shift is set to π/4, a periodic pattern with a ⅛ wavelength is formed.

As described above, by making a phase difference between the two beams, the interference fringes of the first light and those of the second light are displaced from each other by a fraction of the fringe pitch (for example, ½ pitch, ¼ pitch, etc.). By applying such first light and second light to the coating having thermal non-linearity one after another, the period of the crystalline regions (denatured regions) and non-crystalline regions (non-denatured regions) is further reduced. Even if the period is further reduced in this way, sharp boundaries are obtained between the crystalline regions and non-crystalline regions, since the coating having thermal non-linearity is used. As a result, a well-resolved microstructure is obtained. By using thermal non-linearity and the phase shift of interference light as described above, the resolution limit due to the wavelength of a laser is circumvented and a fine pattern is realized in theory. Also, in practice, a much finer pattern than patterns formed in related art manufacturing processes is realized.

Figure 14:
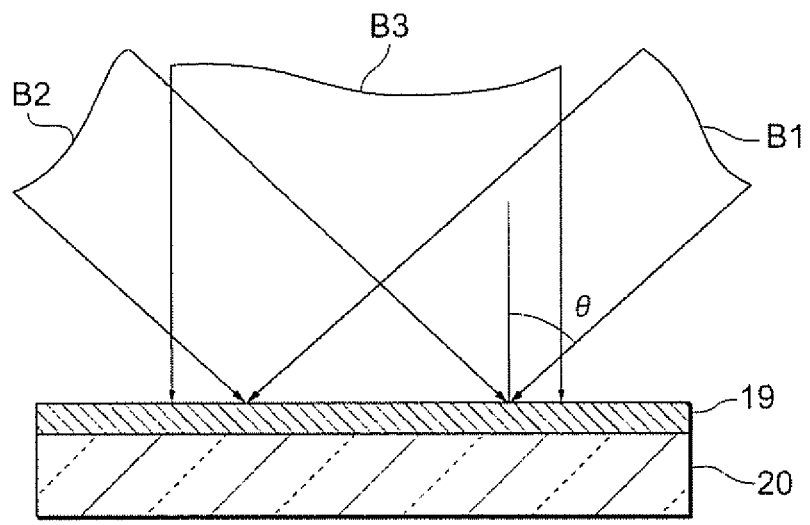
FIG. 14 is a schematic sectional view showing a microstructure manufacturing process according to a fourth embodiment of the invention.

FIG. 14 is schematic sectional views showing a microstructure manufacturing process according to a fourth one of the embodiments. It is also preferable to apply, to the object (coating) 19, another light (third light) as well as the interference light generated using two diffraction beams in the step of applying interference light (laser interference exposure step) in the first and second embodiments described with reference to FIGS. 10A to 10C and FIGS. 11A to 11D and further as shown in FIG. 14.

Figure 15:
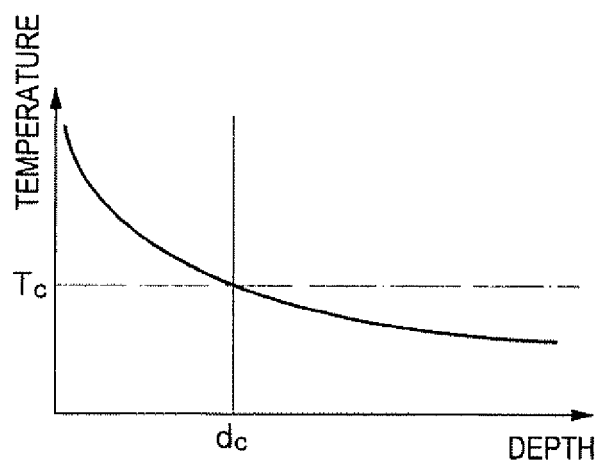
FIG. 15 is a graph showing the depth of a phase change caused according to a change in temperature.
Figure 16:
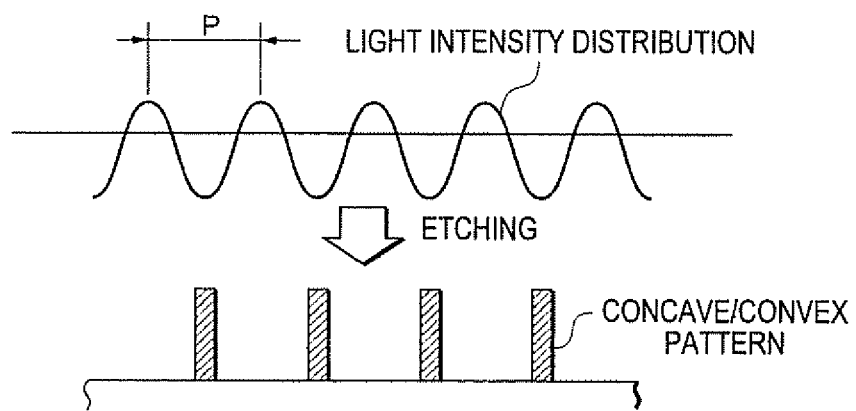
FIG. 16 is a diagram schematically showing an aspect of a surface-relief pattern formed according to the period of interference fringes.

For example, a laser beam B3 different from the diffraction beams B1 and B2 used to perform interference exposure is applied onto the object 19. By doing this, another laser beam B3 serves to bias the interference intensity of the two diffraction beams B1 and B2. Thus, as shown in FIG. 15, the depth dc of regions of the object 19 that exceed the transition point Tc is further increased. By forming crystalline regions of the object 19 in this way and etching these regions, a deeper surface-relief pattern than those formed in the first and second embodiments described with reference to FIGS. 10A to 10C and FIGS. 11A to 11D is formed on the object 19, as shown in FIG. 16. This method is also effective if an attempt is made to form a surface-relief pattern over a wide area if the transition point Tc of the material selected as the object 19 is high. Also, even if the intensities of the diffraction beams B1 and B2 used to generate interference light are not enough high, a surface-relief pattern can be formed over a wide area of the surface of the object 19 by performing the above-described interference bias exposure. Note that while a case where the regions in which the light intensity is relatively low and that remain in a non-crystalline state are left is shown in FIG. 16, there is also a case where the regions in which the light intensity is relatively high and that have been put into a crystalline state are left. In the latter case, convex portions of a surface-relief pattern are arranged so as to correspond to bright portions in the light intensity distribution.

Also, by using the surface-relief pattern formed on the object 19 as an etching mask, the surface-relief pattern may be transferred to an object (see FIG. 11) previously provided beneath the object 19.

Various types of light other than the above-described laser beam may be used as the third light as long as the light serves to bias the temperature of the object 19. While it is preferable in terms of effective biasing that a wavelength $\lambda 2$ of the third light be the same as or near a wavelength $\lambda 1$ of the diffraction beams B1 and B2 as the first light, the wavelength $\lambda 2$ is not limited thereto. Also, the third light need not be light with a single wavelength and may be light including components of multiple wavelengths. For example, an excimer laser (wavelength: 308 nm) may be used as the light source of the third light. By additionally performing such a bias exposure, an area that can be exposed to interference light is expanded. Thus, a pattern is formed over a wider area all at once.

A specific example in which the above-described embodiments are applied to a process of manufacturing a metal grid-type polarization splitter will now be described.

An aluminum film is formed on a quartz glass substrate and then a platinum oxide film is formed on the aluminum film. For example, the thickness of the aluminum film is 150 nm and that of the platinum oxide film is 100 nm. A Q switch nano pulse YAG laser (wavelength: 266 nm) is used as the light source 10. The average output of the laser is 1 W (at the pulse repetition frequency of 1 kHz). A laser beam emitted from the light source 10 is split into two laser beams and then the two split laser beams (diffraction beams) are crossed. Thus, interference light is generated. The interference angle $\theta$ is set to 72°. According to Eq. 1 described above, the period of interference fringes on a surface of the platinum oxide film serving as an object is 140 nm. The first exposure is performed using this interference light. Note that a bias exposure may also be performed using the third light as appropriate. Subsequently, by performing etching using an alkali solution, a platinum oxide pattern with the same period as that of the interference fringes, that is, a period of 140 nm is formed. Then, by dry-etching the aluminum film using the platinum oxide pattern as an etching mask, the platinum oxide pattern is transferred to the aluminum film formed therebelow. Thus, a striped aluminum film (aluminum grid) with a period of 140 nm is formed on the quartz glass substrate. A microstructure manufactured in this way is used, for example, as a polarization beam splitter.

Also, if interference light is generated under the above-described conditions, the phase difference between the beams for the first exposure is set to $\phi$ (arbitrary value) and that for the second exposure is set to $\phi+\pi$. The phase difference between the first and second exposures is set to $\pi$. After doing this, the second exposure is performed. A bias exposure may also be performed using the third light as appropriate. Subsequently, by performing etching using an alkali solution, a platinum oxide pattern with half the period of the interference fringes, that is, with a period of 70 nm is formed. Then, by dry-etching the aluminum film using this platinum oxide pattern as an etching mask, the platinum oxide pattern is transferred to the aluminum film formed therebelow. Thus, a striped aluminum film (aluminum grid) with a period of 70 nm is formed on the quartz glass substrate. A microstructure manufactured in this way is used, for example, as a polarization beam splitter.

Figure 17A:
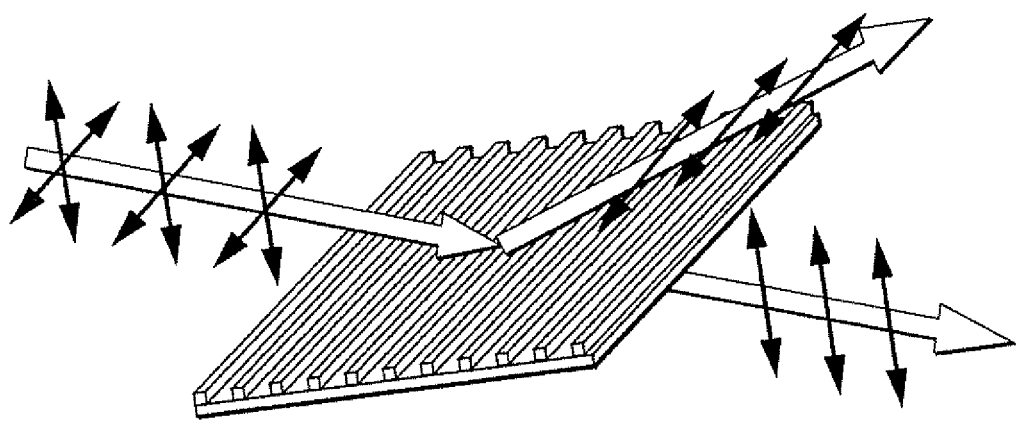
FIG. 17 are drawings schematically showing a structure of a polarization beam splitter that is one example of a microstructure.
Figure 17B:
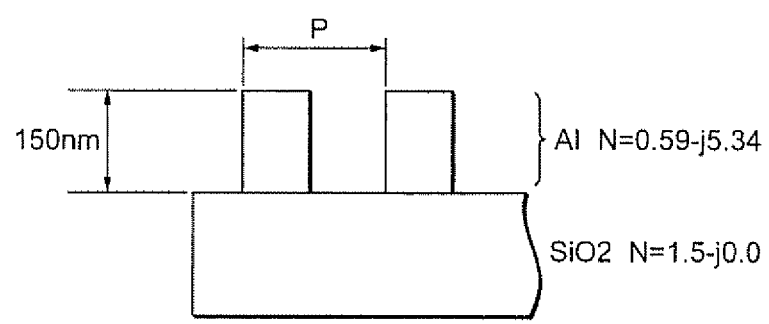
Figure 18:
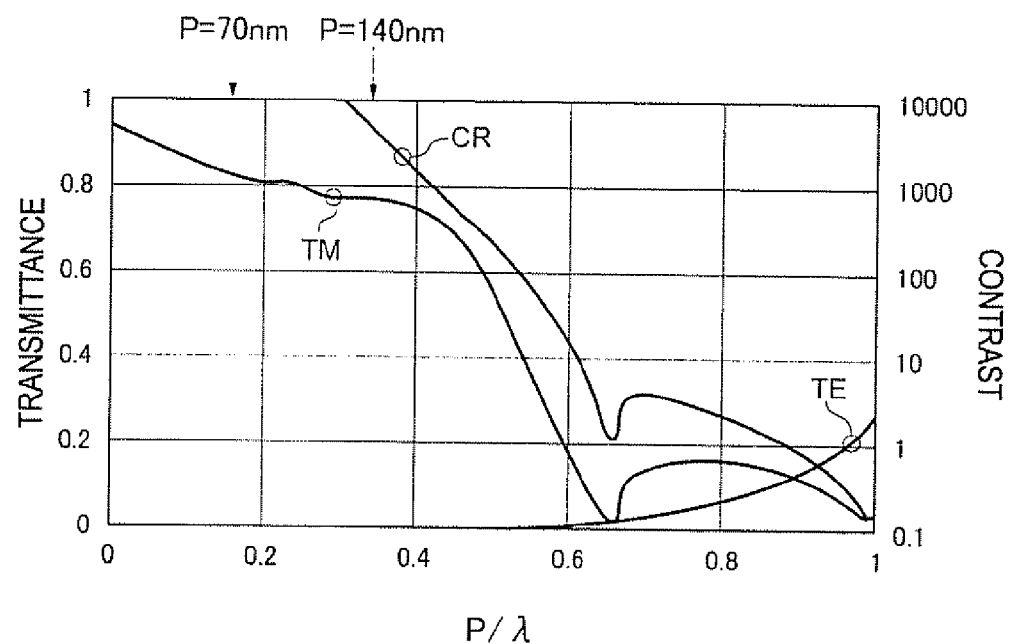
FIG. 18 is a graph showing characteristics of the polarization beam splitter.

FIGS. 17A and 17B are drawings schematically showing a structure of a polarization beam splitter manufactured as described above. Specifically, FIG. 17A is a perspective view showing a function of the polarization beam splitter and FIG. 17B is a partial schematic sectional view of the polarization beam splitter. In the polarization beam splitter, an aluminum film with a thickness of 150 nm is formed into stripes (one-dimensional grip pattern) on a glass substrate ($SiO_2$). The period P of the grid of the aluminum film is 70 nm or 140 nm. The complex dielectric constant N of the glass substrate is 1.5-j0.0 and that of the aluminum film is 0.59-j5.34. FIG. 18 shows polarization beam-splitting characteristics of this polarization beam splitter. In FIG. 18, the vertical axis represents the transmittance (left) and contrast (right), and the horizontal axis represents the ratio of the grid period P to the wavelength $\lambda$. The contrast is defined as the ratio of the transmittance of transverse-electric (TE) polarized light to that of transverse magnetic (TM) polarized light. As is understood from this result, the polarization beam splitter exhibits higher performance (that is, the transmittance becomes higher or the contrast becomes higher) as the period P of the grid pattern (subwavelength structure) of the polarization beam splitter is reduced. In FIG. 18, a characteristic corresponding to the period P of 70 nm and a characteristic corresponding to the period P of 140 nm are indicated by the respective arrows in an upper part of the graph.

Both the polarization beam splitters exhibit excellent polarization beam-splitting characteristics. In particular, it is understood that the polarization beam splitter with the period P of 70 nm is much more excellent in transmittance and contrast characteristics than that with the period P of 140 nm.

The invention is not limited to the above-described embodiments and various changes and modifications can be made thereto without departing from the spirit and scope of the invention. While the polarization beam splitter is used as a specific example in which the embodiments of the invention is applied, the invention is also useful when manufacturing various devices in which micro- and nano-patterns need be formed. Among such devices are optical thin film devices, semiconductor thin film devices, tracking marks, and fine mechanical devices. Applications to optical thin film devices include antireflective films for use in a liquid crystal application device, phase difference plates, optical waveguides, polarizing elements, alignment layers, photonic structures for use in a light-emitting element such as a light-emitting diode (LED) or electroluminescent (EL) element, and high-density optical disks.

While the crystalline regions are used as one example of the denatured regions and the crystalline regions are used as one example of the denatured regions in the above-described embodiments, the denatured regions and non-denatured regions are not limited thereto. Any denatured regions and non-denatured regions that make a difference in etching rate therebetween due to differences in physical properties (physical or chemical natures) therebetween may be used.

What is claimed is:

1. A microstructure manufacturing method comprising:
   (a) generating first light including an interference fringe by crossing two laser beams;
   (b) forming a denatured region and a non-denatured region on an object having thermal non-linearity by applying the first light onto the object, so that the denatured region and the non-denatured region are disposed so as to correspond to a period of the interference fringe of the first light;
   (c) etching the object so that the denatured region or the non-denatured region is selectively eliminated; and
   during step (b) and before step (c),
   (d) generating second light including an interference fringe by making a phase difference between the two laser beams and then crossing the two laser beams; and
   (e) forming a denatured region and a non-denatured region by applying the second light onto the object, so that the denatured region and the non-denatured region are disposed so as to correspond to a period of the interference fringe of the second light; and
   wherein:
   the denatured region is a crystalline region and the non-denatured region is a non-crystalline region and wherein the object consists essentially of PtO, ZnS—SiO$_2$, Ge—Sb—Te, Ge—Sb—Te—S, Te—TeO$_2$—Ge—Sn, Te—Ge—Sn—Au, Ge—Te—Sn, Sn—Se—Te, Sb—Se—Te, Sb—Se, Ga—Se—Te—Ge, In—Se, In—Se—Tl—Co, In—Se—Te, Ag—In—Sb—Te or TeO$_2$—Pb, and
   in step (d), a third light as well as the second light is applied onto the object, wherein the first light, second light and the third light are different.

2. The microstructure manufacturing method according to claim 1, wherein in step (b), third light as well as the first light is applied onto the object.

3. The microstructure manufacturing method according to claim 2, wherein the third light is light of a single wavelength or light including components of multiple wavelengths.

4. A microstructure manufacturing method comprising:
   (a) forming a coating having thermal non-linearity on an object;
   (b) generating first light including an interference fringe by crossing two laser beams;
   (c) forming a denatured region and a non-denatured region on the coating by applying the first light onto the coating, so that the denatured region and the non-denatured region are disposed so as to correspond to a period of the interference fringe of the first light;
   (d) etching the coating so that the denatured region or non-denatured region is selectively eliminated;
   (e) etching the object using the coating from which the denatured region or non-denatured region has been eliminated; and
   during step (c) and before step (d),
   (f) generating second light including an interference fringe by making a phase difference between the two laser beams and then crossing the two laser beams; and
   (g) forming a denatured region and a non-denatured region on the coating by applying the second light onto the coating, so that the denatured region and the non-denatured region are disposed so as to correspond to a period of the interference fringe of the second light; and
   wherein:
   the denatured region is a crystalline region and the non-denatured region is a non-crystalline region and wherein the coating consists essentially of PtO, ZnS—SiO$_2$, Ge—Sb—Te, Ge—Sb—Te—S, Te—TeO$_2$—Ge—Sn, Te—Ge—Sn—Au, Ge—Te—Sn, Sn—Se—Te, Sb—Se—Te, Sb—Se, Ga—Se—Te—Ge, In—Se, In—Se—Tl—Co, In—Se—Te, Ag—In—Sb—Te or TeO$_2$—Pb, and
   in step (g), a third light as well as the second light is applied onto the coating, wherein the first light, second light and the third light are different.

5. The microstructure manufacturing method according to claim 4, wherein in step (c), third light as well as the first light is applied onto the coating.

6. A microstructure manufacturing method comprising:
   (a) forming an amorphous, inorganic material layer on a metal film;
   (b) applying light generated by crossing a first laser beam and a second laser beam, onto the inorganic material layer, and heating a first portion of the inorganic material layer, the first portion corresponding to a period of an interference fringe of the light, up to a crystallization temperature or higher so that the first portion is denatured into a crystalline portion;
   (c) eliminating the first portion on the metal film and leaving a second portion of the inorganic material layer, the second portion having not been denatured into the crystalline portion; and
   (d) eliminating a region of the metal film, the region not overlapping the second portion, so that a structure with a pitch equal to the period of the interference fringe is formed,
   wherein:
   the inorganic material layer consists essentially of PtO, ZnS—SiO$_2$, Ge—Sb—Te, Ge—Sb—Te—S, Te—TeO$_2$—Ge—Sn, Te—Ge—Sn—Au, Ge—Te—Sn, Sn—Se—Te, Sb—Se—Te, Sb—Se, Ga—Se—Te—Ge, In—Se, In—Se—Tl—Co, In—Se—Te, Ag—In—Sb—Te or TeO$_2$—Pb, and
   in step (b), another light being a third laser beam is applied onto the inorganic material layer, wherein the first laser beam, second laser beam and the third laser beam are different.

7. The microstructure manufacturing method according to claim 6, wherein in step (b), the first portion is completely heated up to a crystallization temperature or higher in a film thickness direction.

8. The microstructure manufacturing method according to claim 6, wherein the metal film includes aluminum, and the structure is a striped grid.

9. The microstructure manufacturing method according to claim 1, wherein the object consists essentially of PtO, ZnS—SiO$_2$, Ge—Sb—Te—S, Te—TeO$_2$—Ge—Sn, Te—Ge—Sn—Au, Ge—Te—Sn, Sn—Se—Te, Sb—Se—Te, Sb—Se, Ga—Se—Te—Ge, In—Se, In—Se—Tl—Co, In—Se—Te, Ag—In—Sb—Te or TeO$_2$—Pb.

10. The microstructure manufacturing method according to claim 4, wherein the coating consists essentially of PtO, ZnS—SiO$_2$, Ge—Sb—Te—S, Te—TeO$_2$—Ge—Sn, Te—Ge—Sn—Au, Ge—Te—Sn, Sn—Se—Te, Sb—Se—Te, Sb—Se, Ga—Se—Te—Ge, In—Se, In—Se—Tl—Co, In—Se—Te, Ag—In—Sb—Te or TeO$_2$—Pb.

11. The microstructure manufacturing method according to claim 6, wherein the inorganic material layer consists essentially of PtO, ZnS—SiO$_2$, Ge—Sb—Te—S, Te—TeO$_2$—Ge—Sn, Te—Ge—Sn—Au, Ge—Te—Sn, Sn—Se—Te, Sb—Se—Te, Sb—Se, Ga—Se—Te—Ge, In—Se, In—Se—Tl—Co, In—Se—Te, Ag—In—Sb—Te or TeO$_2$—Pb.

12. The microstructure manufacturing method according to claim 1, wherein the object consists essentially of PtO.

13. The microstructure manufacturing method according to claim 4, wherein the coating consists essentially of PtO.

14. The microstructure manufacturing method according to claim 6, wherein the inorganic material layer consists essentially of PtO.

* * * * *